US012317992B2

(12) United States Patent
Lenney

(10) Patent No.: US 12,317,992 B2
(45) Date of Patent: Jun. 3, 2025

(54) UNIVERSAL GUTTER GUARD CLEANING BRUSH

(71) Applicant: GutterGlove, Inc., Franklin, TN (US)

(72) Inventor: Robert C. Lenney, Lincoln, CA (US)

( * ) Notice: Subject to any disclaimer, the term of this patent is extended or adjusted under 35 U.S.C. 154(b) by 0 days.

(21) Appl. No.: 17/810,281

(22) Filed: Jun. 30, 2022

(65) Prior Publication Data

US 2022/0330686 A1 Oct. 20, 2022

Related U.S. Application Data

(63) Continuation of application No. 17/088,516, filed on Nov. 3, 2020, now Pat. No. 11,388,983, which is a (Continued)

(51) Int. Cl.

| | |
|---|---|
| ***A46B 5/00*** | (2006.01) |
| ***A46B 9/02*** | (2006.01) |
| ***B25G 1/04*** | (2006.01) |
| ***B25G 3/02*** | (2006.01) |
| ***B25G 3/36*** | (2006.01) |

(Continued)

(52) U.S. Cl.

CPC .............. *A46B 5/0008* (2013.01); *A46B 5/00* (2013.01); *A46B 9/02* (2013.01); *A46B 9/025* (2013.01); *B25G 1/04* (2013.01); *B25G 3/02* (2013.01); *B25G 3/36* (2013.01); *E04D 13/0765* (2013.01);

(Continued)

(58) Field of Classification Search

CPC ........... A46B 5/0008; A46B 5/00; A46B 9/02; A46B 9/025; A46B 15/0085; A46B 2200/3073; B25G 1/04; B25G 3/36; E04D 13/0765

See application file for complete search history.

(56) References Cited

U.S. PATENT DOCUMENTS 1,732,058 A 10/1929 Martini
1,893,002 A * 1/1933 Rothschild ............... A46B 5/02 15/167.1

(Continued)

FOREIGN PATENT DOCUMENTS

AU 2013201320 3/2013
CA 1310167 11/1992

(Continued)

OTHER PUBLICATIONS

Valor Gutter Guard's Melt Away Use Guide, published Apr. 2014.

*Primary Examiner* — Marc Carlson

(74) *Attorney, Agent, or Firm* — Jonathan Kidney; Glen Gross; Intelink Law Group, P.C.

(57) ABSTRACT

A brush with bristles attached to multiple sides is designed to clean any gutter guard type that is manufactured today, including reverse curve type gutter guards. The brush has a main body of reverse-oriented bristles and accommodates an extension pole on the "reverse" side. When placed on top of the gutter guard, the brush can be pushed/pulled back and forth using the pole to dislodge any unwanted debris attached to the gutter guard's working surface. The use of the pole removes the need for a person to be on the roof when attempting to clean the gutter and/or gutter guard. With multiple bristle orientations, the brush can be used for other outdoor cleaning uses, such as house fixtures, structures, windows and so forth.

16 Claims, 16 Drawing Sheets

Related U.S. Application Data continuation of application No. 15/837,767, filed on Dec. 11, 2017, now Pat. No. 10,827,821.

(60) Provisional application No. 62/431,981, filed on Dec. 9, 2016.

(51) Int. Cl.
*E04D 13/076* (2006.01)
*A46B 15/00* (2006.01)

(52) U.S. Cl.
CPC ... *A46B 15/0085* (2013.01); *A46B 2200/3073* (2013.01)

(56) References Cited

U.S. PATENT DOCUMENTS 2,229,381 A 1/1941 Grow
2,288,121 A 6/1942 Sandmeyer
2,569,568 A 10/1951 Lipshaw
2,583,422 A * 1/1952 Haddon ................ E04D 13/076 52/12
2,674,961 A 4/1954 Lake
2,855,618 A * 10/1958 Jones ....................... A46B 9/02 15/160
2,935,954 A 5/1960 Matthews
2,997,763 A 8/1961 Serfass
3,350,045 A 10/1967 Mayers
3,630,383 A 12/1971 Reeves
3,691,343 A 9/1972 Norman
3,925,264 A 12/1975 Corte
3,945,080 A * 3/1976 Hamner ................... A46B 3/00 15/207.2
4,254,595 A 3/1981 Crossien
4,308,696 A 1/1982 Schroeder
4,435,466 A 3/1984 Kuhnel et al.
4,573,290 A 3/1986 Fleming
4,604,837 A 8/1986 Beam
4,646,488 A 3/1987 Burns
4,745,710 A 5/1988 Davis
4,750,300 A 6/1988 Winger
4,755,229 A 7/1988 Armanini
4,769,526 A 9/1988 Taouil
4,827,686 A 5/1989 Stamper
4,941,299 A 7/1990 Sweers
4,949,514 A 8/1990 Weller
4,954,015 A 9/1990 McGowan
4,959,932 A 10/1990 Pfeifer
5,010,696 A 4/1991 Knittel
5,035,092 A 7/1991 Brant
5,038,528 A 8/1991 Brant
5,044,581 A * 9/1991 Dressler ................ E04D 13/076 52/12
5,067,675 A 11/1991 Brant
5,092,086 A 3/1992 Rognsvoog, Sr.
5,098,045 A 3/1992 Pepper
5,107,635 A 4/1992 Carpenter
5,109,640 A 5/1992 Creson
5,127,200 A 7/1992 Doran
5,181,350 A 1/1993 Meckstroth
5,216,852 A 6/1993 Bemis et al.
5,228,247 A 7/1993 Dressler
5,257,482 A 11/1993 Sichel
5,261,195 A 11/1993 Buckenmaier
5,274,872 A * 1/1994 Rich ........................ B25G 3/04 15/176.3
5,315,090 A 5/1994 Lowenthal
5,371,979 A 12/1994 Kwiatkowski et al.
5,375,379 A 12/1994 Meckstroth
5,391,858 A 2/1995 Tourangeau et al.
5,398,464 A 3/1995 Jacobs
5,406,754 A 4/1995 Cosby
5,406,756 A 4/1995 Bemis et al.
5,438,803 A 8/1995 Blizard, Jr.
5,459,965 A 10/1995 Meckstroth
D364,338 S 11/1995 Cline
5,522,185 A 6/1996 Cline
D372,421 S 8/1996 Cline
5,558,705 A 9/1996 Keemer et al.
5,570,557 A 11/1996 Kwiatkowski et al.
5,617,678 A 4/1997 Morandin
5,640,809 A 6/1997 Iannelli
5,729,931 A 3/1998 Wade
5,759,255 A 6/1998 Venturini et al.
5,836,117 A 11/1998 Johnson
5,842,311 A 12/1998 Morin
5,842,469 A 12/1998 Rapp et al.
5,848,857 A 12/1998 Killworth et al.
5,853,209 A * 12/1998 McDermott ........ E04D 13/0765 294/104
5,878,533 A 3/1999 Swanfeld
5,893,240 A 4/1999 Ealer, Sr.
D418,403 S 1/2000 Cline
D419,863 S 2/2000 Mullane
6,035,587 A 3/2000 Dressler
6,134,843 A 10/2000 Tregear
6,194,049 B1 2/2001 Bindschedler-Galli et al.
6,194,519 B1 2/2001 Blalock et al.
6,199,241 B1 * 3/2001 Anumah .................. A46B 9/02 15/160
6,205,715 B1 * 3/2001 Rex, Jr. ................. E04D 13/076 52/12
6,225,600 B1 5/2001 Burris
6,223,777 B1 6/2001 Smith et al.
6,266,929 B1 7/2001 Cline
6,341,462 B2 1/2002 Kiik et al.
D457,423 S 5/2002 Mullane
6,412,228 B1 7/2002 Meckstroth
6,468,613 B1 10/2002 Kitano
6,499,176 B1 * 12/2002 Hammond ............... A46B 7/04 15/145
D475,613 S 6/2003 Mullane
6,598,352 B2 7/2003 Higginbotham
6,607,781 B2 8/2003 Joedicke et al.
D481,929 S 11/2003 McNichol
6,543,729 B1 11/2003 Ylonen
6,700,098 B1 3/2004 Wyatt et al.
6,708,452 B1 3/2004 Tenute
6,759,630 B1 7/2004 Tenute
D494,461 S 8/2004 Dressler
D495,595 S 9/2004 Dressler
6,804,852 B1 * 10/2004 Hay ......................... A46B 9/02 15/176.1
D499,331 S 12/2004 Dressler
6,933,007 B2 8/2005 Fensel et al.
6,942,419 B2 9/2005 Knak et al.
6,944,991 B2 9/2005 Kim
6,944,992 B2 9/2005 Brochu
6,951,077 B1 10/2005 Higginbotham
6,951,323 B1 10/2005 McNichol
D511,451 S 11/2005 Mullane
6,959,512 B2 11/2005 Cobb
D514,670 S 2/2006 Handley
7,017,614 B2 3/2006 Handley
D519,025 S 4/2006 Dressler
7,056,422 B2 6/2006 Swistun
7,104,012 B1 9/2006 Bayram
7,127,852 B1 10/2006 Dressler
7,174,677 B1 2/2007 Dressler
7,174,688 B2 2/2007 Higginbotham
7,191,564 B2 3/2007 Higginbotham
7,241,500 B2 7/2007 Shiao et al.
7,267,503 B1 * 9/2007 Bentsen ............. A46B 15/0055 401/48
7,310,912 B2 12/2007 Lenney
7,340,863 B1 3/2008 Dressler
D568,616 S * 5/2008 Berti .............................. D4/199
7,434,358 B2 10/2008 Smith
7,448,167 B2 11/2008 Bachman
7,493,686 B2 2/2009 Barford
7,516,576 B1 4/2009 Mullane
7,587,780 B2 * 9/2009 Pfister ...................... A46B 7/04 56/400.21
7,597,119 B2 10/2009 Boettner

(56) References Cited

U.S. PATENT DOCUMENTS

| | | | | |
|---|---|---|---|---|
| 7,624,541 | B2 | 12/2009 | Gentry | |
| 7,677,271 | B2 | 3/2010 | Boettner | |
| 7,726,076 | B2 | 6/2010 | Staub | |
| 7,793,465 | B2 | 9/2010 | McCann | |
| 7,913,458 | B2 | 3/2011 | Higginbotham | |
| D638,920 | S | 5/2011 | Ealer, Sr. | |
| 7,975,435 | B2 | 7/2011 | Lenney | |
| 8,033,058 | B2 | 10/2011 | Block | |
| 8,079,183 | B2 | 12/2011 | Lenney | |
| 8,251,302 | B2 | 8/2012 | Sloan, Jr. | |
| 8,276,321 | B2 | 11/2012 | Bell | |
| 8,312,677 | B2 | 11/2012 | Higginbotham | |
| 8,418,410 | B2 | 4/2013 | Martin | |
| 8,438,788 | B2 | 5/2013 | Bell et al. | |
| 8,479,454 | B2 | 7/2013 | Lenney | |
| 8,495,837 | B2 | 7/2013 | McCoy | |
| 8,572,899 | B1 | 11/2013 | Pearce et al. | |
| 8,607,827 | B2 | 12/2013 | Bell | |
| 8,677,694 | B2 | 3/2014 | Ash | |
| 8,689,837 | B1 | 4/2014 | Smith | |
| D709,357 | S | 7/2014 | Bell | |
| 8,782,960 | B2 | 7/2014 | Nark | |
| 9,080,328 | B1 | 7/2015 | Smith | |
| D752,722 | S | 3/2016 | Boettner | |
| 9,309,995 | B2 | 4/2016 | Bell | |
| 9,487,955 | B2 | 11/2016 | Breyer | |
| D790,672 | S | 6/2017 | Benjamin | |
| 9,890,535 | B2 | 2/2018 | Breyer | |
| 9,976,309 | B2 | 5/2018 | Lenney | |
| 9,982,438 | B2 | 5/2018 | Casey | |
| 10,081,937 | B2 | 9/2018 | Elliott | |
| D837,048 | S | 1/2019 | Benjamin et al. | |
| 10,233,647 | B2 | 3/2019 | Benjamin et al. | |
| D878,189 | S | 3/2020 | Benjamin et al. | |
| 10,827,821 | B2 * | 11/2020 | Lenney | B25G 3/36 |
| 2001/0054625 | A1 | 12/2001 | Iggulden | |
| 2003/0046876 | A1 | 3/2003 | Higginbotham | |
| 2003/0187539 | A1 | 10/2003 | Smith | |
| 2003/0198736 | A1 | 10/2003 | Fensel et al. | |
| 2004/0000020 | A1 * | 1/2004 | Li | E04D 13/0765 15/160 |
| 2004/0064909 | A1 * | 4/2004 | Locklear | A46B 9/025 15/160 |
| 2005/0072114 | A1 | 4/2005 | Shiao et al. | |
| 2005/0235577 | A1 | 10/2005 | Smith | |
| 2005/0257432 | A1 | 11/2005 | Higginbotham | |
| 2005/0279036 | A1 | 12/2005 | Brochu | |
| 2006/0037252 | A1 | 2/2006 | Gosse et al. | |
| 2006/0090404 | A1 | 5/2006 | Lovell | |
| 2006/0117510 | A1 * | 6/2006 | Sellers | E04D 13/0765 15/160 |
| 2006/0117670 | A1 | 6/2006 | Tsioris | |
| 2006/0179723 | A1 | 8/2006 | Robins | |
| 2006/0196124 | A1 | 9/2006 | Bachman | |
| 2006/0213129 | A1 | 9/2006 | Bachman | |
| 2006/0230687 | A1 | 10/2006 | Ealer, Sr. | |
| 2006/0277831 | A1 | 12/2006 | Bachman | |
| 2006/0283096 | A1 | 12/2006 | Bachman | |
| 2006/0288652 | A1 | 12/2006 | Gurr | |
| 2007/0054129 | A1 | 3/2007 | Kalkanoglu et al. | |
| 2007/0065640 | A1 | 3/2007 | Joedicke | |
| 2007/0094939 | A1 | 5/2007 | Bachman | |
| 2007/0107323 | A1 | 5/2007 | Higginbotham | |
| 2007/0180639 | A1 * | 8/2007 | Libman | B25G 3/06 15/145 |
| 2007/0199169 | A1 * | 8/2007 | Vosbikian | A47L 13/12 15/106 |
| 2007/0199276 | A1 | 8/2007 | Duque | |
| 2007/0218251 | A1 | 8/2007 | Jacobs | |
| 2007/0220814 | A1 | 9/2007 | Faulks | |
| 2007/0234647 | A1 | 10/2007 | Higginbotham | |
| 2007/0246449 | A1 | 10/2007 | Bachman | |
| 2007/0193012 | A1 | 11/2007 | Bergman et al. | |
| 2008/0000169 | A1 | 1/2008 | Handley | |
| 2008/0187708 | A1 | 8/2008 | Decker | |
| 2008/0248241 | A1 | 10/2008 | Kalkanoglu et al. | |
| 2009/0056234 | A1 | 3/2009 | Brochu | |
| 2009/0064628 | A1 | 3/2009 | Mellott et al. | |
| 2009/0139180 | A1 | 6/2009 | Kehs et al. | |
| 2009/0300995 | A1 | 12/2009 | Nikolopoulos | |
| 2010/0042579 | A1 | 2/2010 | Larsen et al. | |
| 2011/0047930 | A1 | 3/2011 | Nark | |
| 2011/0049118 | A1 | 3/2011 | Nark | |
| 2011/0056145 | A1 | 3/2011 | Lenney | |
| 2011/0067318 | A1 | 3/2011 | Lenney et al. | |
| 2011/0138698 | A1 | 6/2011 | Neumann | |
| 2011/0253611 | A1 | 10/2011 | Higginbotham | |
| 2012/0042579 | A1 | 2/2012 | McCoy | |
| 2012/0049511 | A1 | 3/2012 | Bell et al. | |
| 2012/0068452 | A1 | 3/2012 | Boettner | |
| 2012/0144759 | A1 | 6/2012 | Higginbotham | |
| 2013/0097943 | A1 | 4/2013 | Higginbotham | |
| 2013/0160377 | A1 | 6/2013 | Sager | |
| 2013/0160378 | A1 | 6/2013 | Higginbotham | |
| 2013/0284650 | A1 | 10/2013 | Higginbotham | |
| 2014/0013702 | A1 | 1/2014 | Pearce et al. | |
| 2014/0130929 | A1 | 5/2014 | Elliott et al. | |
| 2014/0196400 | A1 | 7/2014 | Bell | |
| 2014/0263001 | A1 | 9/2014 | Higginbotham | |
| 2015/0143756 | A1 | 5/2015 | Higginbotham | |
| 2017/0089071 | A1 | 3/2017 | Smith et al. | |
| 2018/0160794 | A1 * | 6/2018 | Lenney | E04D 13/0765 |
| 2018/0179761 | A1 | 6/2018 | Higginbotham | |
| 2022/0330686 | A1 * | 10/2022 | Lenney | A46B 9/025 |

FOREIGN PATENT DOCUMENTS

| | | | | |
|---|---|---|---|---|
| CA | 2021168 | | 2/2002 | |
| CA | 2021169 | | 2/2002 | |
| CA | 2476351 | | 11/2005 | |
| CA | 2551297 | | 12/2007 | |
| CA | 2390777 | | 5/2008 | |
| CA | 2752598 | | 3/2013 | |
| DE | 102006034405 | B3 * | 10/2007 | A46B 5/00 |
| DE | 202012000310 | U1 * | 8/2012 | A46B 5/005 |
| DE | 102013110918 | A1 * | 4/2015 | A46B 9/026 |
| EP | 1344640 | | 4/2006 | |
| EP | 2518226 | | 10/2012 | |
| FR | 2694775 | | 11/1997 | |
| JP | 06-146506 | | 5/1994 | |
| JP | 09228592 | | 9/1997 | |
| JP | 2000-008559 | | 1/2000 | |
| JP | 2011143044 | A * | 7/2011 | A46B 7/02 |
| KR | 1989-10803 | | 7/1989 | |
| KR | 1989-23083 | | 12/1989 | |
| KR | 1998-16228 | | 6/1998 | |
| WO | WO1999053157 | | 10/1999 | |

* cited by examiner

300

UNIVERSAL GUTTER GUARD CLEANING BRUSH

CROSS-REFERENCE TO RELATED APPLICATION(S)

This application is a continuation of U.S. patent application Ser. No. 17/088,516, filed Nov. 3, 2022, issuing as U.S. Pat. No. 11,388,983 on Jul. 17, 2022 which is a Continuation-in-Part of U.S. non-provisional patent application Ser. No. 15/837,767 filed Dec. 11, 2017, issued as U.S. Pat. No. 10,827,821 on Nov. 10, 2020, which claims the benefit of U.S. Provisional Patent Application No. 62/431,981, filed Dec. 9, 2016, the contents of which are hereby incorporated by reference in their entireties.

FIELD

This invention relates to a multi-sided cleaning brush. More particularly, it relates to a multi-sided cleaning brush designed for efficient cleaning of outdoor fixtures having difficult-to-clean surface shapes, for example, rain gutters, gutter guards, crevices, edges and so forth.

BACKGROUND

To clean off the top surface of a rain gutter guard, homeowners or contractors would typically climb a ladder, get on the roof and use a powered blower for blowing debris off the gutter guard (and roof). It is a dangerous task, as the effort to climb a tall ladder with a blower in tow can be challenging, the roof can be slippery, and the blower can be awkward to handle while standing on the roof. Further, the blower cannot effectively remove organic matter (e.g., moss) or roof shingle particles that can attach to the gutter guard surface.

Accordingly, there has been a long-standing need in the industry for a cleaning apparatus suitable for cleaning gutter guards as well as other difficult to reach surfaces in an effective and non-dangerous manner. As detailed below, a new brush design and system is presented that addresses the deficiencies of the prior art.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a brush for removing debris from gutter guards is provided, comprising: a bristle retaining head with a rectangular shape having a top and bottom face and lateral front, rear, left and right faces with rounded edges, wherein the bottom and top faces are substantially larger than the other faces; bristles disposed on and extending outwardly from the top, bottom, left, right and rear faces, wherein a central portion of the bottom face, reserved for attachment to a pole, is un-bristled and the un-bristled central portion extends towards the rear face; an angled mounting fixture disposed in the un-bristled central portion and midway between the left and right faces, an axis of the mounting fixture being oriented at an acute angle relative to the bottom face, and enabling attachment to an elongate pole in a reverse direction (bottom-to-top) at the acute angle to the bottom face, the angle being directed to towards the rear face; and wherein, when the prospective pole is attached, the prospective pole is below the bottom face and the brush is operated with the pole below the bottom face.

In another aspect of the disclosed embodiments, the above brush is provided, further comprising, outwardly extending bristles disposed on at least one of the left, right, and rear faces; and/or further comprising, outwardly extending bristles disposed on at least one of a forward and rearward portion of the top face; and/or wherein the head has a rectangular block shape; and/or further comprising an extension pole mounted to the mounting mechanism; and/or wherein the angle for attaching a pole is approximately 30 degrees; and/or wherein the angle is angled towards the front face; and/or wherein the mounting fixture is a threaded hole in the head and is disposed mid-way between the left and right faces; and/or wherein the threaded hole forms a channel through the entire head; and/or wherein channel is multi-width; and/or wherein the head is approximately 8.75 inches in length, 1 inch in height and 2.38 inches deep; and/or wherein the bristles form a row of bristles; and/or wherein the row of bristles is formed from circular groups of bristles arranged in a line; and/or wherein the reserved central portion extends partially or completely to at least one of the front and rear faces, to form a substantially V-like void in the bottom bristle arrangement; and/or wherein at least one of the bristles of the bottom, top, left, right, top, are of a uniform length; and/or wherein at least one of the left, right, rear, top and bottom bristles is at a length different from the bristles of the other faces; and/or wherein at least one of the left, right, rear, top and bottom bristles is at an angle from its respective face.

In yet another aspect of the disclosed embodiments, a method for cleaning a surface of a gutter guard is provided, comprising: placing a brush, with a bristle arrangement in a direction of an attached pole, onto a top surface of a gutter guard disposed on a gutter, wherein a gripping section of the pole is positioned below the gutter, the brush comprising: a bristle retaining head, the head having at least a predominately front, rear, left, right, top and bottom face, wherein the bottom and top faces are substantially larger than the other faces; bristles disposed on a majority of the bottom face, wherein the bristles are outwardly extending from the bottom face, and wherein a central portion of the bottom face, reserved for attachment to the pole, is un-bristled; and a mounting fixture attached to the pole at an acute angle to the bottom face, disposed in the un-bristled central portion of the bottom face; and moving the brush via the pole forward and back over the surface of the gutter guard, to dislodge debris from the gutter guard.

In yet another aspect of the disclosed embodiments, a the above method is provided, wherein the bristle head further comprises, outwardly extending bristles disposed on at least one of the left, right, top and rear faces, and moving the brush via the pole over a side or edge of the gutter guard or gutter.

In yet another aspect of the disclosed embodiments, a method for cleaning an exterior surface is provided, comprising: placing a cleaning brush, with a reverse bristle arrangement, attached to an extension pole, onto an exterior surface, wherein the brush comprises: a bristle retaining head, the head having at least a predominately front, rear, left, right, top and bottom face, wherein the bottom and top faces are substantially larger than the other faces; bristles disposed on a majority of the bottom face, wherein the bristles are outwardly extending from the bottom face, and wherein a central portion of the bottom face, reserved for attachment to the pole, is un-bristled; outwardly extending bristles disposed on at least one of the left, right, top and rear faces; and a mounting fixture for attaching the pole at an acute angle to the bottom face, disposed in the un-bristled central portion of the bottom face; and moving a bristled face of the head over the exterior surface to clean the exterior surface.

In yet another aspect of the disclosed embodiments, a gutter guard brush for removing debris from gutter guards, is provided, comprising: a bristle retaining head, the head having at least a predominately front, rear, left, right, top and bottom face, wherein the bottom and top faces are substantially larger than the other faces; bristles disposed on a majority of the bottom face, wherein the bristles are outwardly extending from the bottom face, and wherein a central portion of the bottom face, reserved for attachment to a pole, is un-bristled; and a mounting fixture for attaching a pole at an acute angle to the bottom face, disposed in the un-bristled central portion of the bottom face.

DETAILED DESCRIPTION

Figure 1:
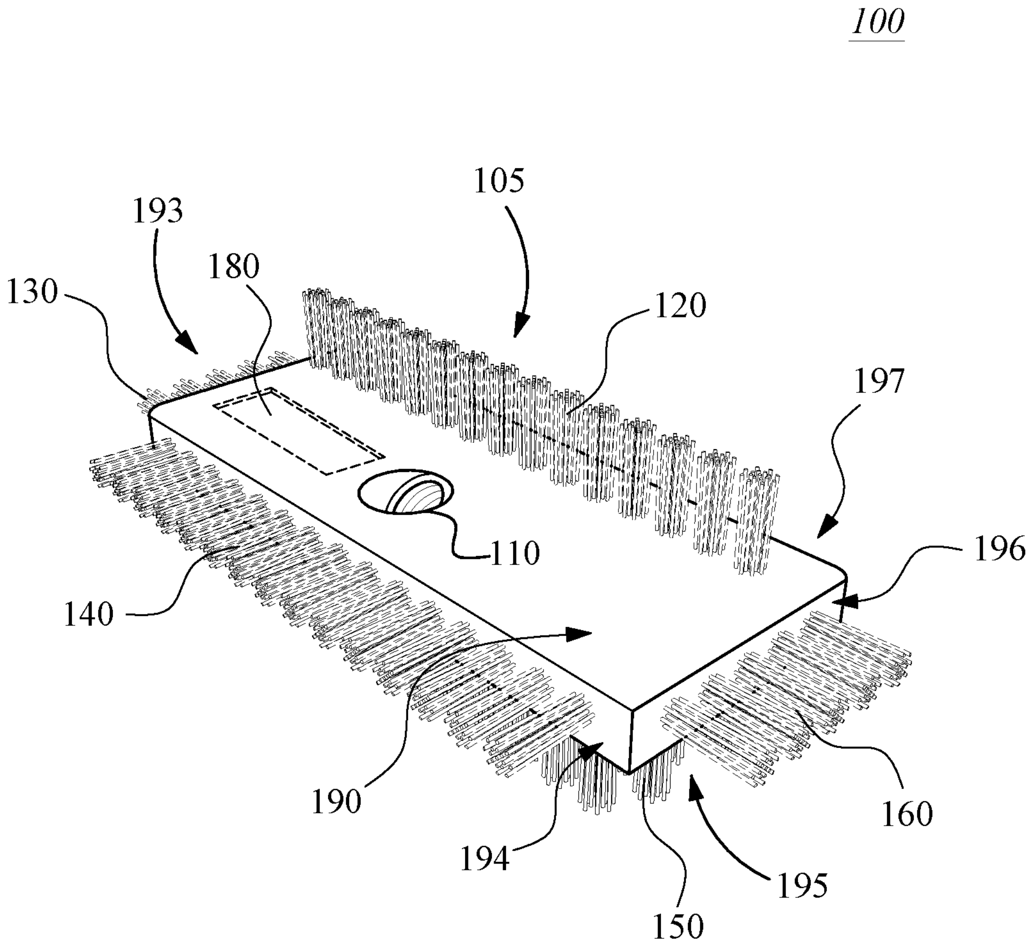
FIG. 1 is an illustration showing a top, rear perspective view of an embodiment of an exemplary gutter guard brush.

A gutter guard is a cover that is attached on top of a rain gutter mounted to a roof for keeping leaves, pine needles and other unwanted debris from entering into the rain gutter. In many instances, where a gutter guard is fastened to the gutter on a home or any building structure, there is an abundance of trees around the home and, often leaves and pine needles will sit on top of the gutter guard interfering with the performance of the guard. Conventionally, a blower directed at the overlain surface of the gutter guard is sufficient to remove the debris. However, organic growth as moss, for example, shingle particles and other small debris can attach or embed themselves to the gutter guard surface, rendering the blower ineffective. Some mechanism of physically cleaning the gutter guard surface is required, one that does not necessitate the cleaner to put themselves in harm's way by climbing a ladder and maneuvering on a roof.

As described in the following figures, a brush for cleaning multiple types of surfaces or crevices is presented, using a design wherein outwardly directed bristles are attached to a multi-sided mounting head, and specifically in a reverse direction from a mounting position of a pole (extension or long enough to reach a roof gutter from ground level). In a tested design, five sides of a multi-shaped head are incorporated with bristles; and the head is in the form of a block or rectangle (having six sides). However, other multi-sided shapes can be used, as well as oblong, cylindrical and other shapes, understanding the rectangular shape is the easiest shape for demonstrating the concepts described herein. A tested block was dimensioned to be approximately 8.75 inches in length, 1 inch in height and 2.38 inches deep. Of course, these are only one of many possible dimensions and, therefore the shape and size can be modified, as desired.

Additionally, while the Figures below show the bristles as being cut to form a single uniform front, it is understood that the bristles may be non-uniformly cut, if so desired. Further, the grouping of the bristle bodies may be varied according to design preference. Therefore, modifications and changes to the bristle shape, arrangement and so forth may be made without departing from the spirit of this disclosure.

As non-limiting examples, the bristles need not be directed perpendicularly from the head face, but can be outwardly directed at an acute angle. Further, the bristles in a specific face need not be identically arranged or identically directed. That is, some bristles may point in different directions, or be sized differently, or grouped in different patters so as to provide a varying "resistance" when applied to a surface. Also, in some embodiments, the bristles need not cover an entire section of a given face, but only a portion, as desired.

In principal, the exemplary brush is designed to clean any gutter guard type that is manufactured today, including metal and plastic gutter guards, and even reverse curve type gutter guards (for example, LeafGuard® manufactured by Englert Incorporated).

The exemplary brush is also designed so that a pole can be attached to the bottom of the brush (or in some embodiments, to either the bottom or top), or operated without a pole (e.g., handheld), if so desired. It is notable that other brushes in the cleaning industry are designed so their bristles point in a direction that is opposite from the pole (e.g., a push broom). The exemplary brush's main body of bristles are oriented in a reverse direction (bottom-side) and form a brushing surface that is in the same side as the pole, which is completely opposite from any brush known in the cleaning industry.

When the exemplary brush is attached onto the end of an extension pole (with the brush bottom facing down—oriented to be "sitting" on top of the gutter guard surface), the brush can be pulled "down" and moved forward and back to dislodge any unwanted debris. The natural "scrubbing" motion operates to release debris from the gutter guard and the debris can be brushed off to fall to the ground. The use of the pole (preferably long enough to reach the top of the gutter) removes the risk of a person having to be on the roof, attempting to clean the gutter and/or gutter guard.

A brush of a tested embodiment has bristles on a bottom/reverse side with optional bristles disposed in other sides of the brush block (understanding that all or lesser sides may be affixed with bristles), allowing for easy brushing of the top of the gutter guard as well as any debris adhering to the front side of the rain gutter. Most particularly for a rain gutter with an attached gutter guard, it is evident the distribution of the bristles on multiple sides of the block provides multiple cleaning interfaces for a given cleaning stroke. Further, by simply reorienting the brush block or tilting it, allows different types of cleaning strokes to be used (e.g., pulling vs. pushing, forward and backward vs. sideways, etc.) As one example, debris stuck to the underside of the rain gutter can be brushed off by tilting the brush block to have the forward or lateral bristles contact the gutter's underside. As another example, the back side of the gutter (under the roof eaves) can be easily reached with the lateral bristles. As will be apparent in the below figures, the exemplary brush provides a "single" tool that can serves multiple functions and easily addresses the confines and shapes found in roof-mounted gutters and guards. The ability to use a single brush to clean different surfaces and shapes, in the context of a roof rain gutter and gutter guard, for example, is a significant improvement over the prior art.

Further, because of the unique design of the exemplary brush, it can be used to clean other surfaces, non-limiting examples being: windows, soffits, grout surfaces between decorative block, ground surfaces and interior or exterior lights. The exemplary brush can also remove spider webs on windows, under eaves, in garages or other places where cob webs form.

FIG. 1 is an illustration showing a top, rear perspective view of an exemplary "gutter guard" brush 100. The brush is composed of a "head" or "block" 105 with a particular arrangement of bristles. The block 105 can be shaped as a square, rectangle or even with curved sides. In some variations, a dome-like head without lateral sides may be used, or be triangular, if so desired. Here, the block 105 is shown as a rectangular object with bottom-facing bristles 150 and optional bristles (denoted in dashed lines) attached to other sides of the block 105, with one side/face 197 devoid of bristles. Optional "top" side bristles 120 are shown as a single row, partially occupying a front segment of a top face 190 of the block 105. In other embodiments, bristles 120 may be a plurality of rows and occupy more than the surface area shown, or occupy a "rear" segment of the top face 190. Additionally, it should be understood that the bristles need not be arrayed in rows, or grouped, but can configured in any shape or arrangement, or be directed at an angle from the block faces. And different bristles may be made of the same or of a different material, if so desired.

Optional "left" side bristles 130, optional "rear" side bristles 140, and optional "right" side bristles 160 are on the lateral sides/faces 193, 194, and 196, respectively, of the block 105, having one or more rows or arrangement of bristles extending outwardly from the block surfaces. "Bottom" side bristles 150, covering a majority of the bottom face 195 of the block 105 round out the arrangement of the bristles on the block 105. In this embodiment, no bristles are provided on the "front" side/face 197. In other embodiments, there may be bristles on the front side/face 197.

Additionally, it is expressly understood that more or less bristles (or shorter or longer) may be present in the left, right, rear, front, etc. sides. That is, as one example, optional left side bristles 130 may be composed of several sections of bristles while optional right side bristles 160 may be composed of a single section of bristles. And the orientation of the bristles may be at an angle that is not perpendicular to the block's faces. Further, in some embodiments, different bristle material types may be used for different sides.

The terms top, bottom, rear/back, front, left, and right are understood to be relative and provided for reference purposes, understanding that depending on the orientation presented, the terminology may accordingly differ.

The block 105 can be made out of various materials, for example, metal, plastic, wood, rubber nylon, etc. The bristles 120, 130, 140, 150, 160 can be made out of a variety of materials including nylon, plastic or animal hair, and so forth. Attachment of an extension pole (not shown) is provided via screw hole 110 somewhere near the middle of the block 105. Screw hole 110 threads can penetrate the block 105 either partially or through its entirety, depending on design preference.

It is understood that the screw hole 110 is only one possible "mounting" mechanism or fixture for joining to an extension pole. Other forms of mounting/joining can be a plate, bolting, welding, gluing, friction, etc., therefore, the exemplary block 105 can be provided with any other alternative mounting mechanism or attachment-enabling fixture without departing from the spirit and scope of this disclosure. Moreover, in some embodiments, the block 105 can be configured without a mounting mechanism, but be designed for hand use only.

Optionally, there is shown an approximate 0.125" recession 180 on the top face 190 of the block 105, where a marketing image or other label can be affixed. Alternatively, a stamped logo or other imprint may be utilized in this area 180. The un-bristled portion of the top surface 190 can be used for placing additional information, or as stated earlier, for other embodiments, more bristles may be placed therein.

Figure 2:
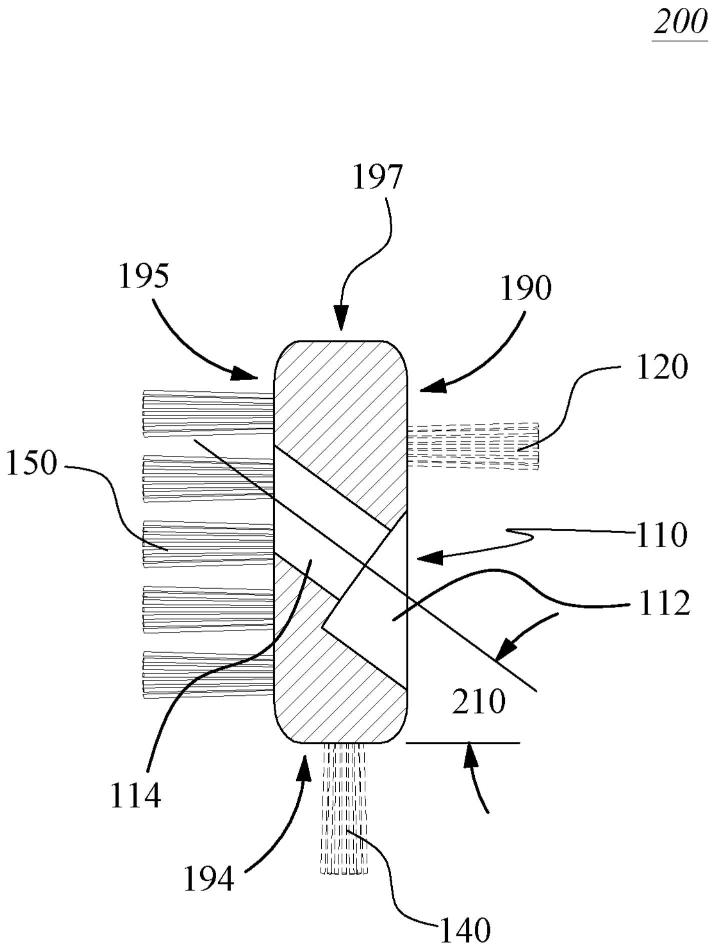
FIG. 2 is an illustration of a cross sectional profile of the exemplary brush of FIG. 1 showing various bristles.

FIG. 2 is an illustration 200 of a cross sectional profile of the exemplary brush 100, with optional top side bristles 120, optional rear side bristles 140, and un-bristled front face 197. Optional screw hole 110 has an acute offset angle 210, which is approximately 30 degrees in this embodiment and optionally penetrates the entirety of the block 105 at an angle substantially perpendicular to the plane of the rear face 194. Of course, other offset angles or non-perpendicular rear (or front face 197) orientations may be used, if so desired. In one embodiment, the angle can be skewed towards a lateral face.

It should also be noted that screw hole 110 may be directed in an opposite direction from what is shown in FIG. 2, so that a pole or handle (not shown) mounted to screw hole 110 protrudes in the direction of the rear side bristles 140, rather than the front face 197.

Screw hole 110 can be composed of one or more channel widths with screw threads at least partially therein, for engagement with a threaded end of a pole (not shown). In this embodiment, two widths 112, 114 are provided, the smaller channel width 114 being on the "bottom" side 195 for the pole entrance. Of course, in some embodiments, a single channel width may be used, or a plurality, if so desired. Also, it is not necessary for the plurality of channels to be axially coincident, so offset channels may be used, if so desired.

Figure 3A:
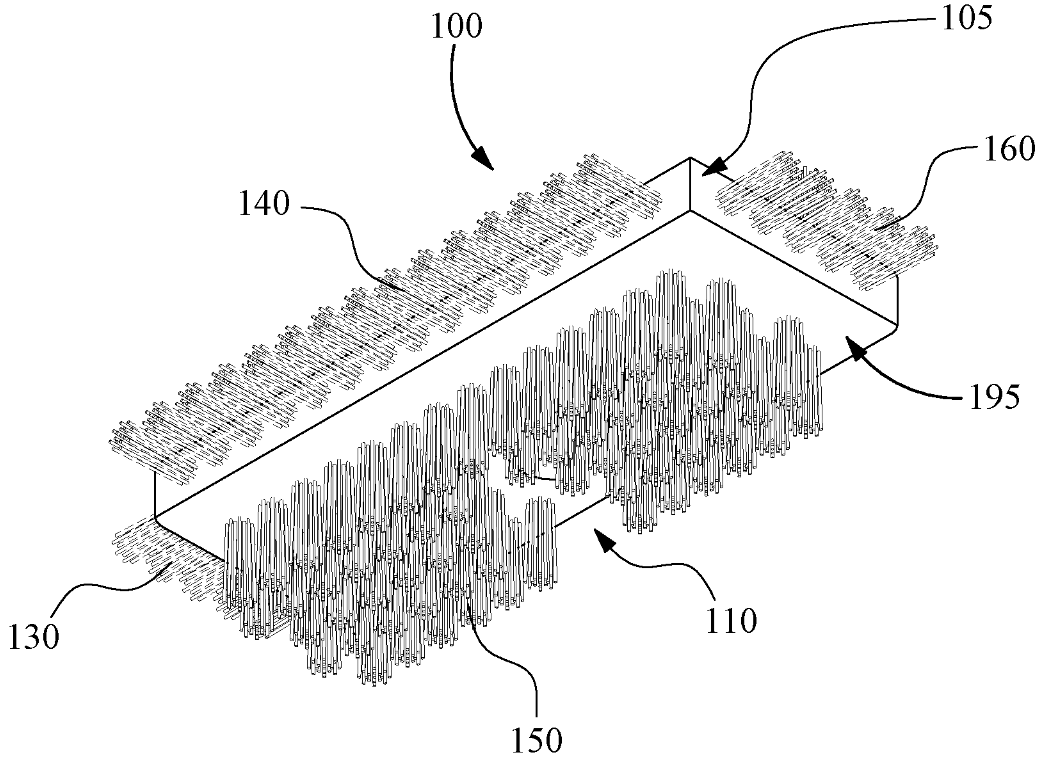
FIG. 3A is an illustration of a bottom perspective view of the exemplary brush of FIG. 1.

FIG. 3A is an illustration 300 of a bottom perspective view of the exemplary brush 100, showing an arrangement of the "bottom" bristles 150 attached to the block 105. Optional left side bristles 130, rear side bristles 140, and right side bristles 160 are also shown. A bristle free area is provided in the center area of the block 105 for screw hole 110 to allow a pole (not shown) to enter unobstructed into the block 105. The bristle free area is shown here as having a substantially V-like shape, but other shapes may be used, if so desired. It should be noted that while this FIG. shows five rows of bristles 150 on the bottom of the block 105, more or less rows may be used, as well as having different row arrangements or grouping of the bristles. That is, circular grouping of the bristles and forming row(s) is shown here, but it is understood the bristles may be grouped or not-grouped, or arranged in a non-row fashion, if so desired.

Figure 3B:
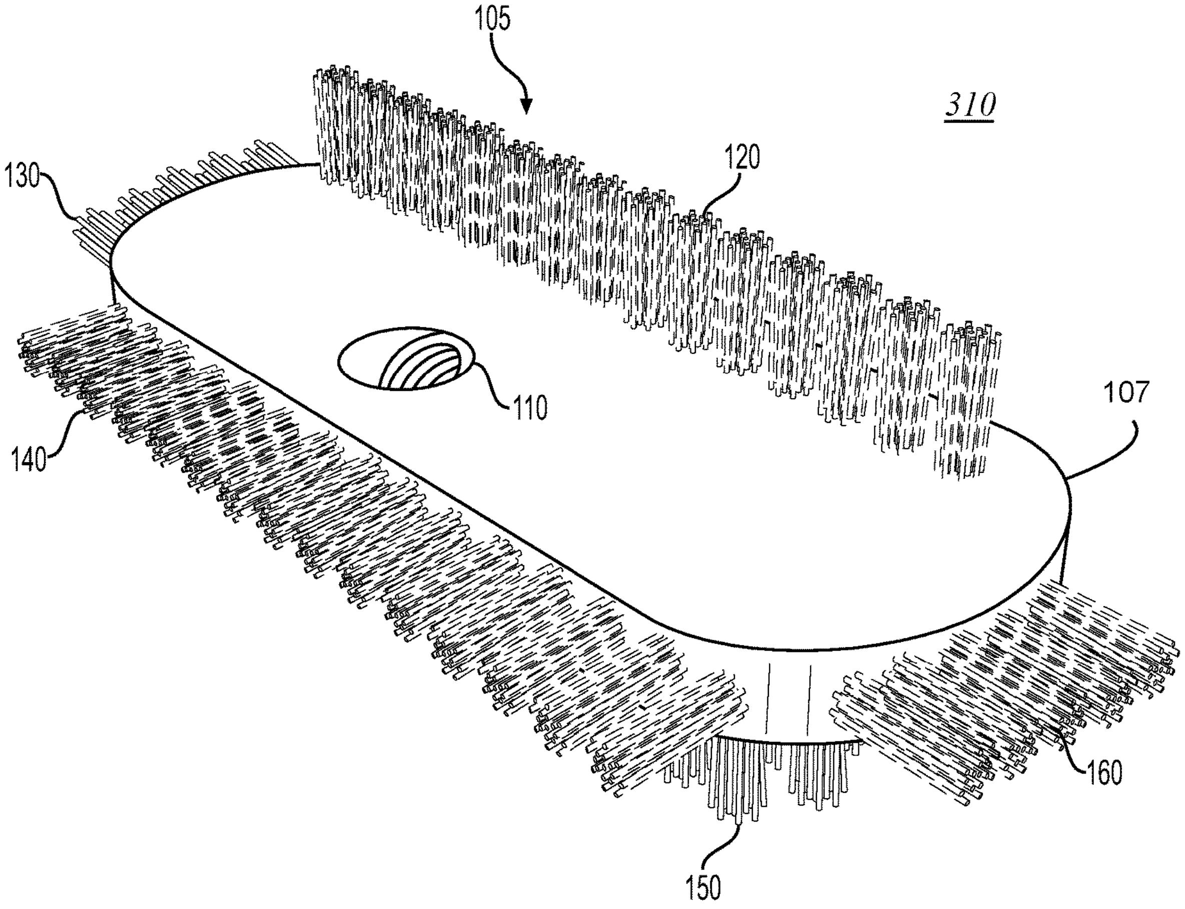
FIG. 3B is an illustration of a top, rear perspective view of another exemplary brush with rounded edges.

FIG. 3B is an illustration of a top, rear perspective view of another exemplary brush with an a head 107 having rounded edges. This embodiment is a slight variation of the embodiment shown in FIG. 1, whereas the head or block 107 has rounded or curved edges. All of the other aspects are similar to the embodiment shown in FIG. 1.

Figure 3C:
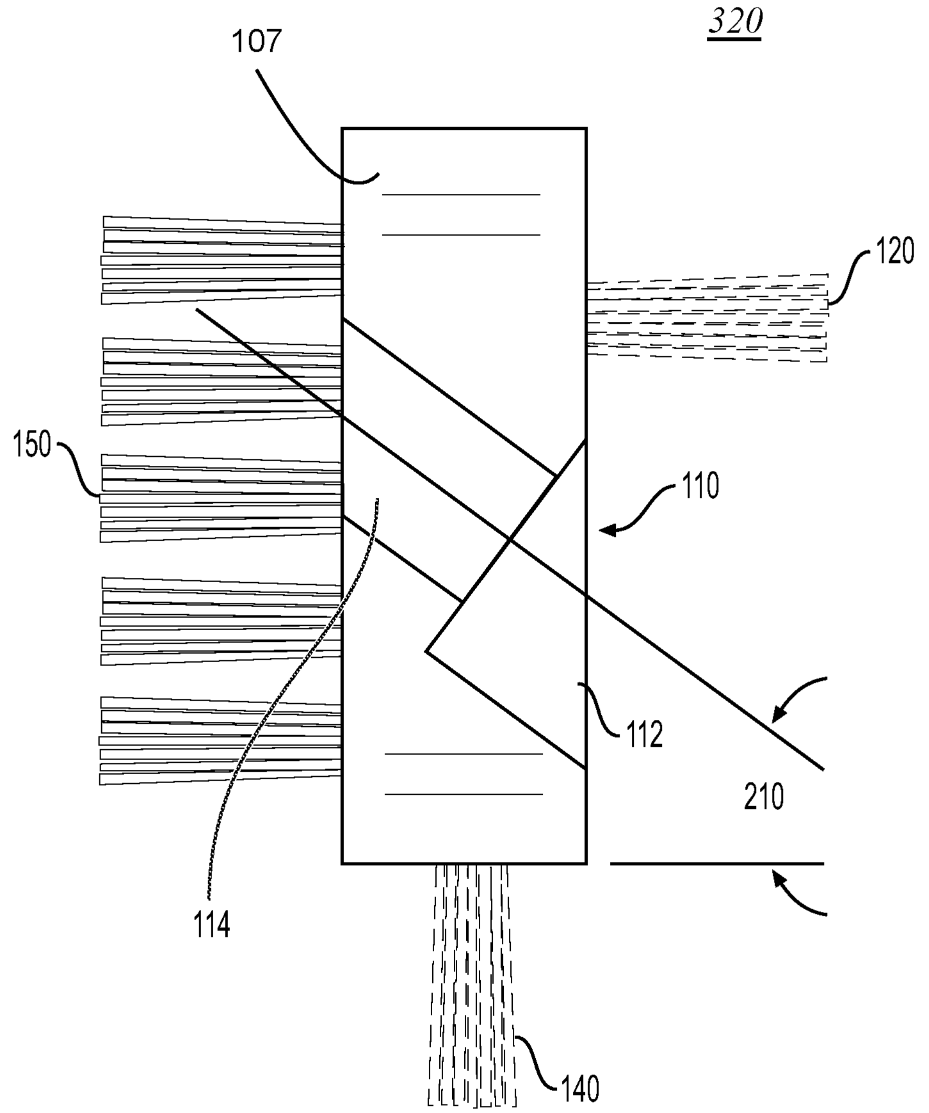
FIG. 3C is an illustration of a cross sectional profile of the exemplary brush of FIG. 3B showing various bristles.

FIG. 3C is an illustration of a cross sectional profile of the exemplary brush of FIG. 3B showing various bristles about the block 107.

Figure 3D:
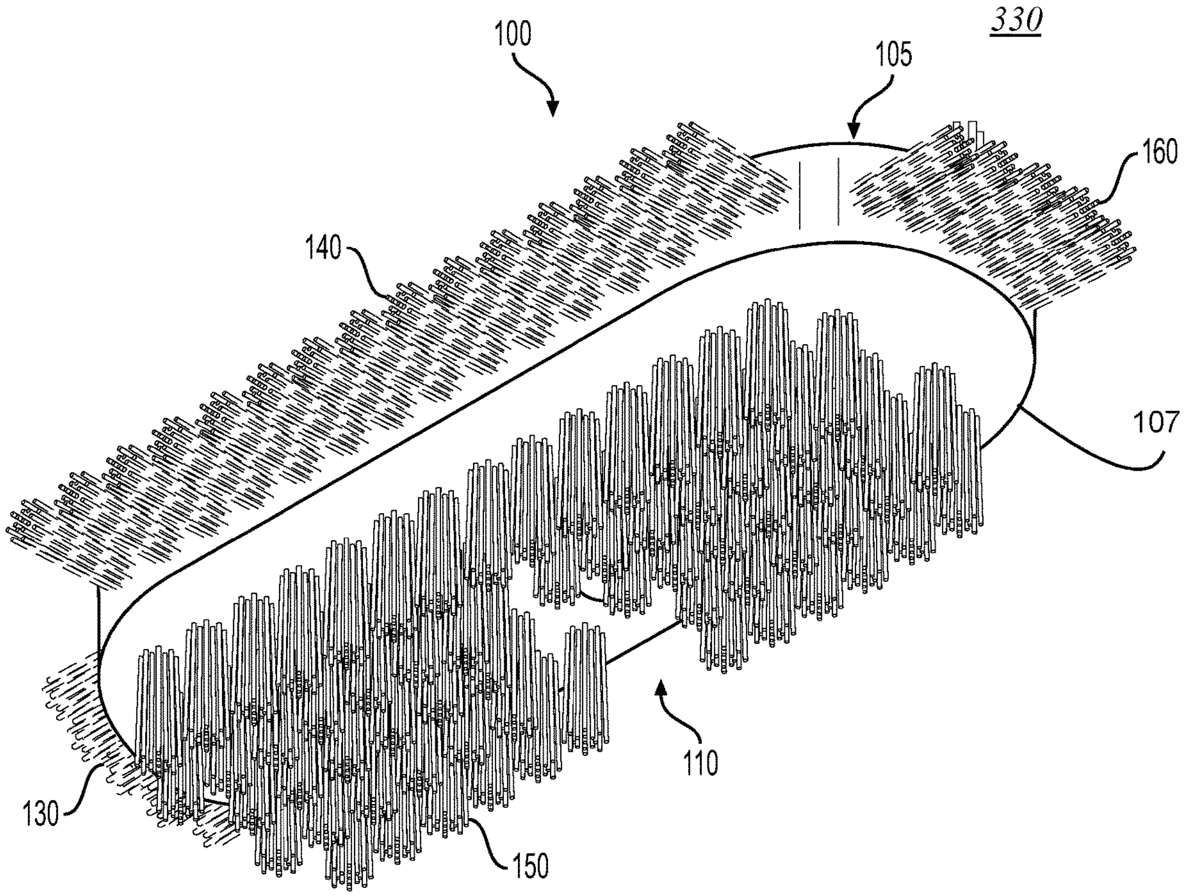
FIG. 3D is an illustration of a bottom perspective view of the exemplary brush of FIG. 3B.

FIG. 3D is an illustration of a bottom perspective view of the exemplary brush of FIG. 3B.

Figure 4:
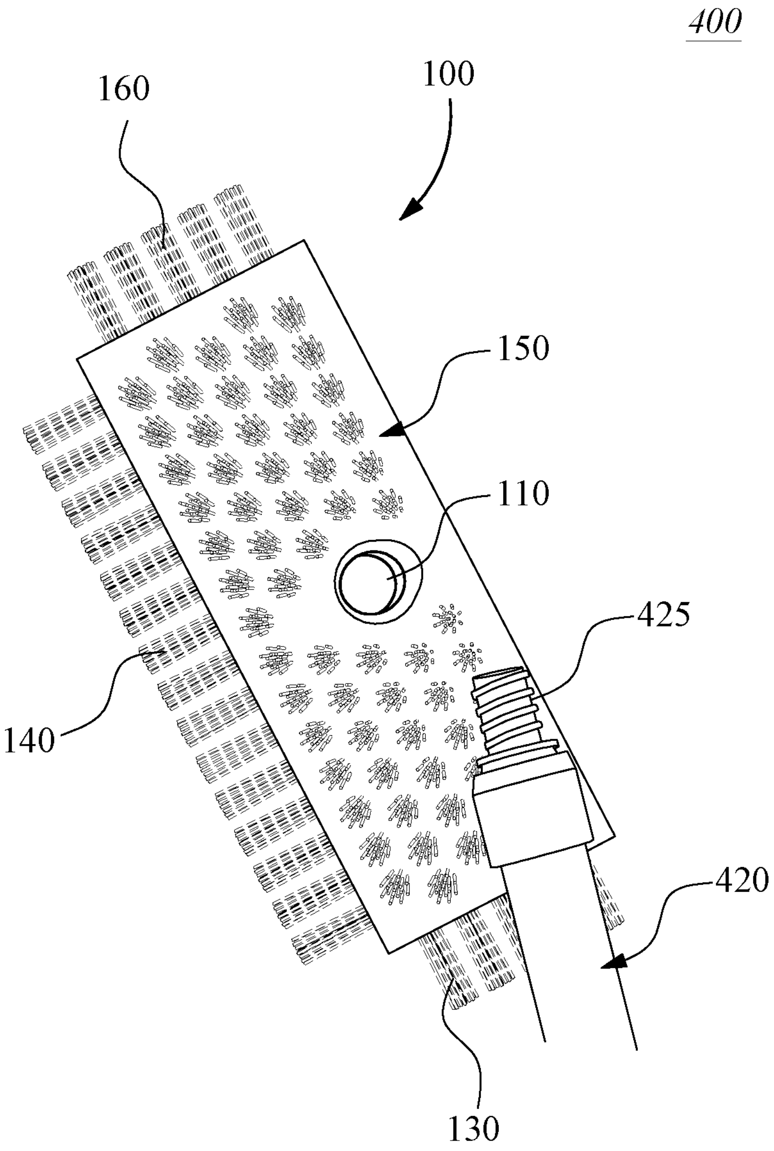
FIG. 4 is an illustration of a bottom view, showing various bristles, the screw hole and an extension pole.

FIG. 4 is an illustration of a bottom view 400 of the embodiment of FIG. 1, showing bottom side bristles 150, optional left side bristles 130, optional rear side bristles 140, and optional right side bristles 160, in addition to mounting mechanism/screw hole 110 and pole 420 with threaded end 425.

Figure 5:
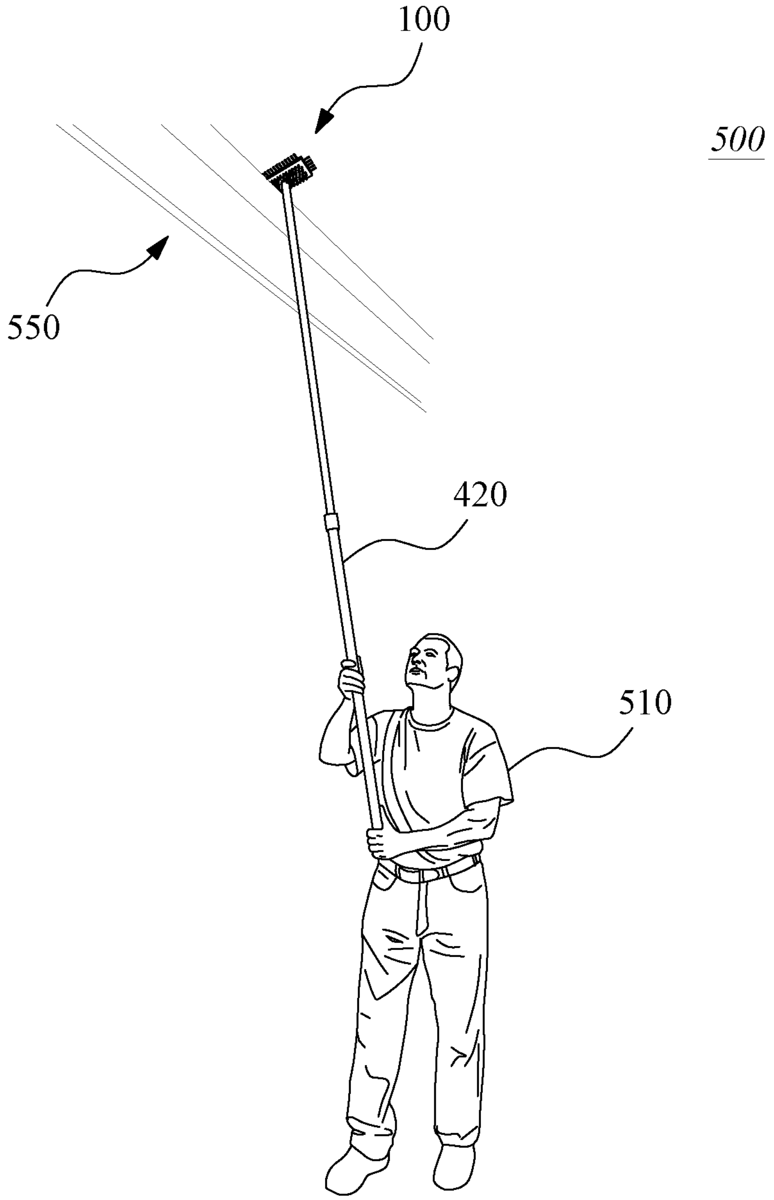
FIG. 5 is an illustration showing a person holding an extension pole attached to the exemplary brush.

FIG. 5 is an illustration 500 showing an exemplary use of the brush 100. Specifically, person 510 holds extension pole 420, which is attached to the exemplary brush 100, placing the reverse-oriented bristles again the top face of a gutter guard (obstructed from view) disposed on gutter 550. This illustration demonstrates how, with the "working" bristles positioned on the same side as the extension pole 420, a person 510 can use the brush 100 to clean objects whose face is pointed away from the pole 420 or from the person 510. By moving the brush 100 back and forth, the bottom bristles will brush against accumulated and attached debris, removing them from the gutter top. Therefore, the gutter guard can be cleaned without requiring the person 510 to climb onto the roof.

Figure 6:
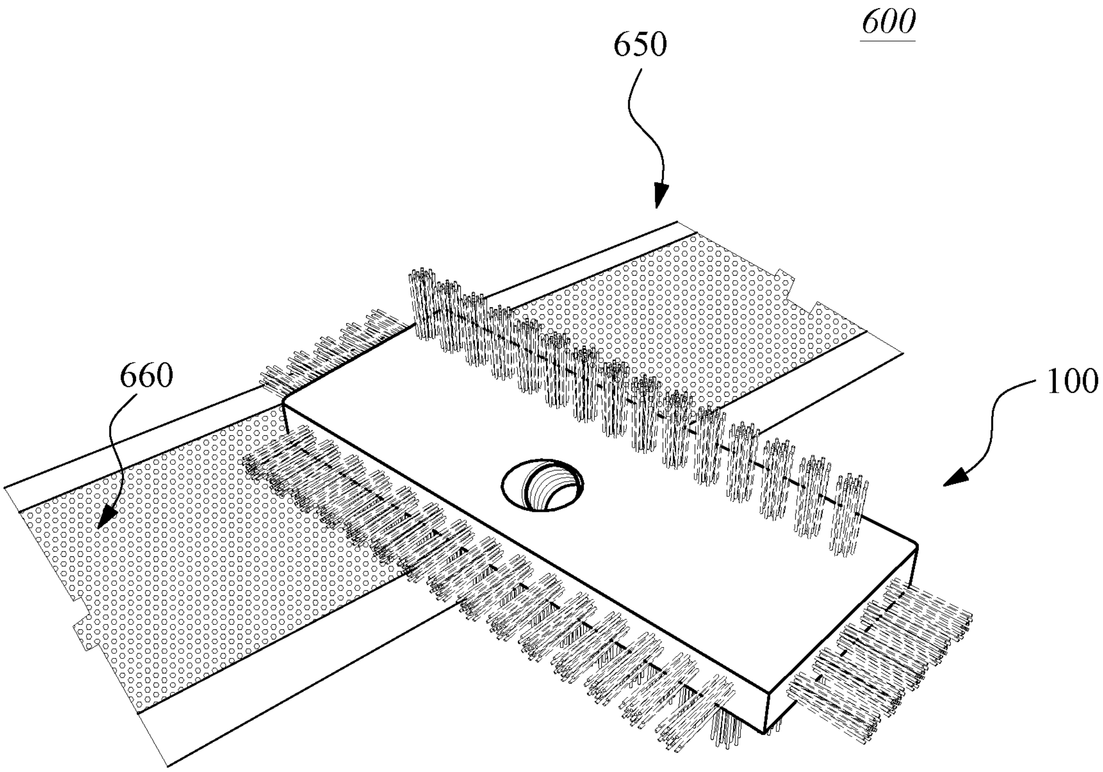
FIG. 6 is an illustration showing the exemplary brush situated on a gutter guard.

FIG. 6 is an illustration 600 showing the exemplary brush 100 without the pole) situated on a generic gutter guard 650. The bottom bristles (obscured from view) will travel over the gutter guard's screen 660 and operate to force debris or attached debris off the face of the screen 660. If optional lateral bristles are incorporated in the brush 100, then by tilting the brush 100, edges of the gutter guard 650 can be scrubbed.

Figure 7:
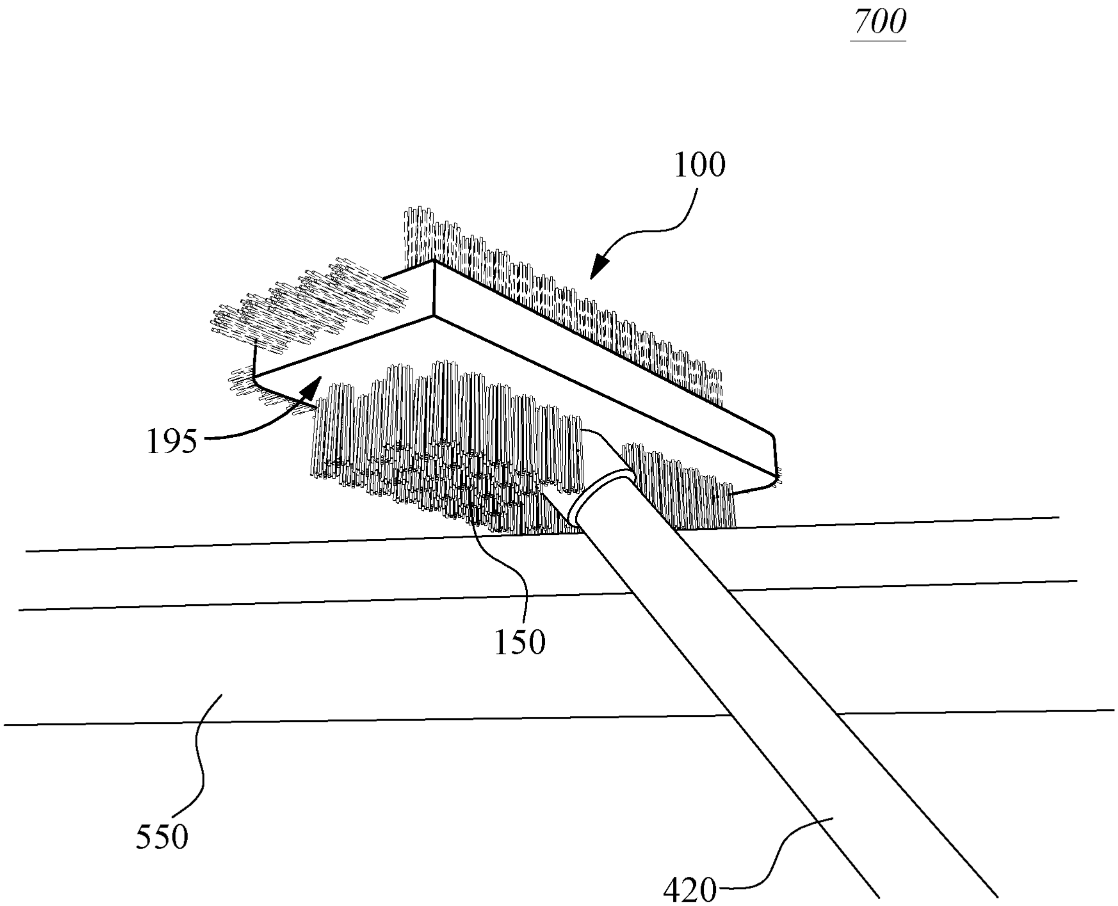
FIG. 7 is an illustration showing a side profile view of FIG. 6, with the pole attached to the exemplary brush.

FIG. 7 is an illustration 700 showing a bottom perspective view of FIG. 6, with the pole 410 attached to the exemplary brush 100. The pole 410 naturally divides the bottom bristles 150 on bottom face 195 into a plurality of sections, one side being over the top of the gutter 550 and the other side being lateral and away from the gutter 550. Having, in this case, two sections, allows the user to operate the brush 100 from a left hand position or a right hand position (by simply rotating the brush 100). In view of this, in some embodiments, the pole 420 may be placed into the brush 100 in a non-centered position, so that there is more surface area for the bottom bristles 150 on one side than the other side. This embodiment may arise for a brush 100 that is designed for large width gutters, the larger side of the bottom bristles 150 being wide enough to extend over the larger widths, while the smaller side of the bottom bristles 150 being suitable for smaller width gutters. It is noted here that the brush 100 can also be positioned to be "parallel" to the gutter 550, and used in that manner, if so desired.

Figure 8:
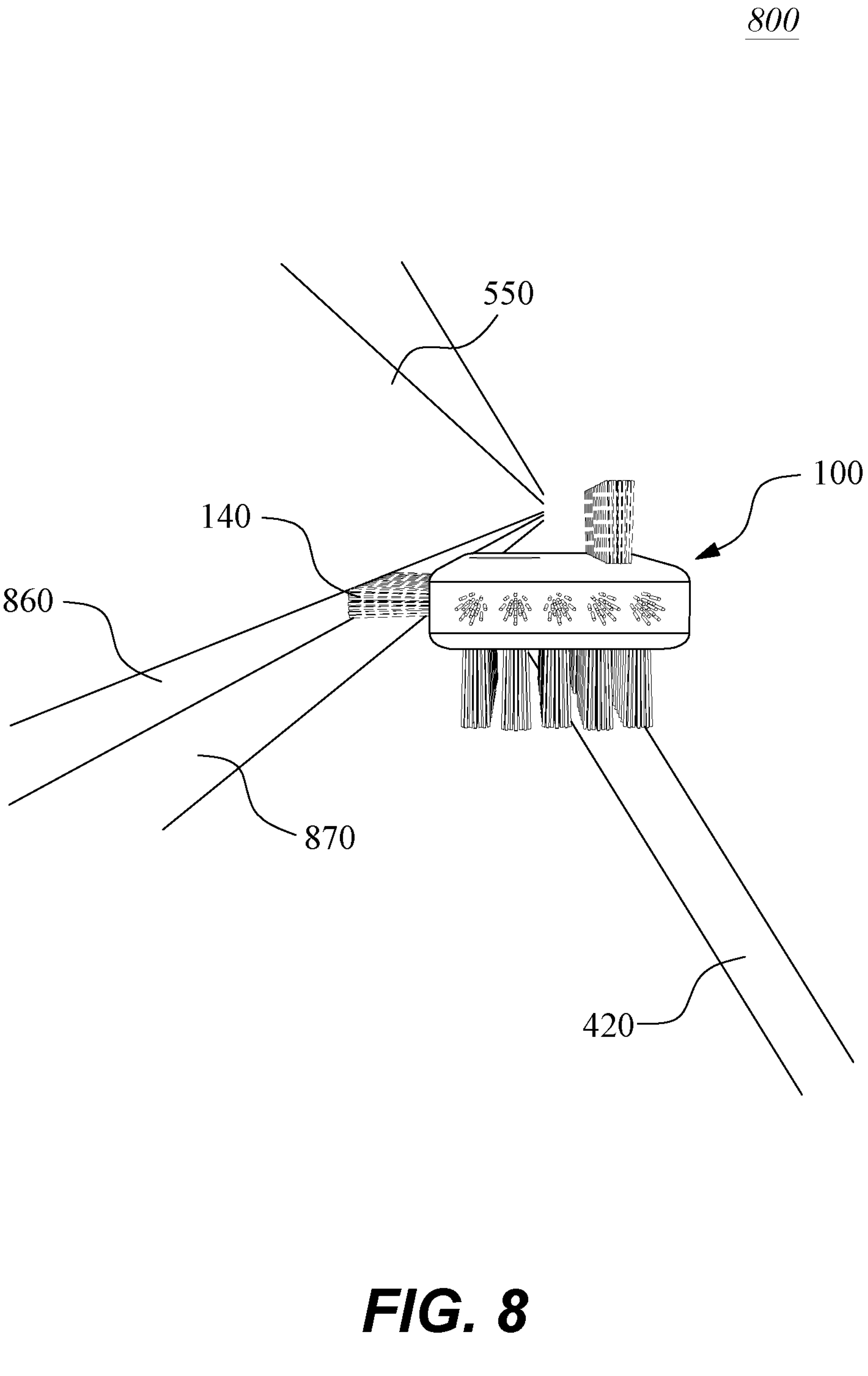
FIG. 8 is a forward view illustration showing the exemplary brush's rear side bristles for cleaning a lower portion of a gutter.

FIG. 8 is a forward view illustration 800 showing back side bristles 140 being used to clean indentation 860 on the lower portion 870 of gutter 550. It is known that gutters are shaped with indentations or crimped edges that run with the length of the gutter 550, and debris, dirt, and in some instances leaves and pine needles can lodge into the indentations/edges. The exemplary brush 100, when configured with laterally protruding bristles, operates very effectively to clean these surfaces as well as any areas of the gutter sides.

Figure 9:
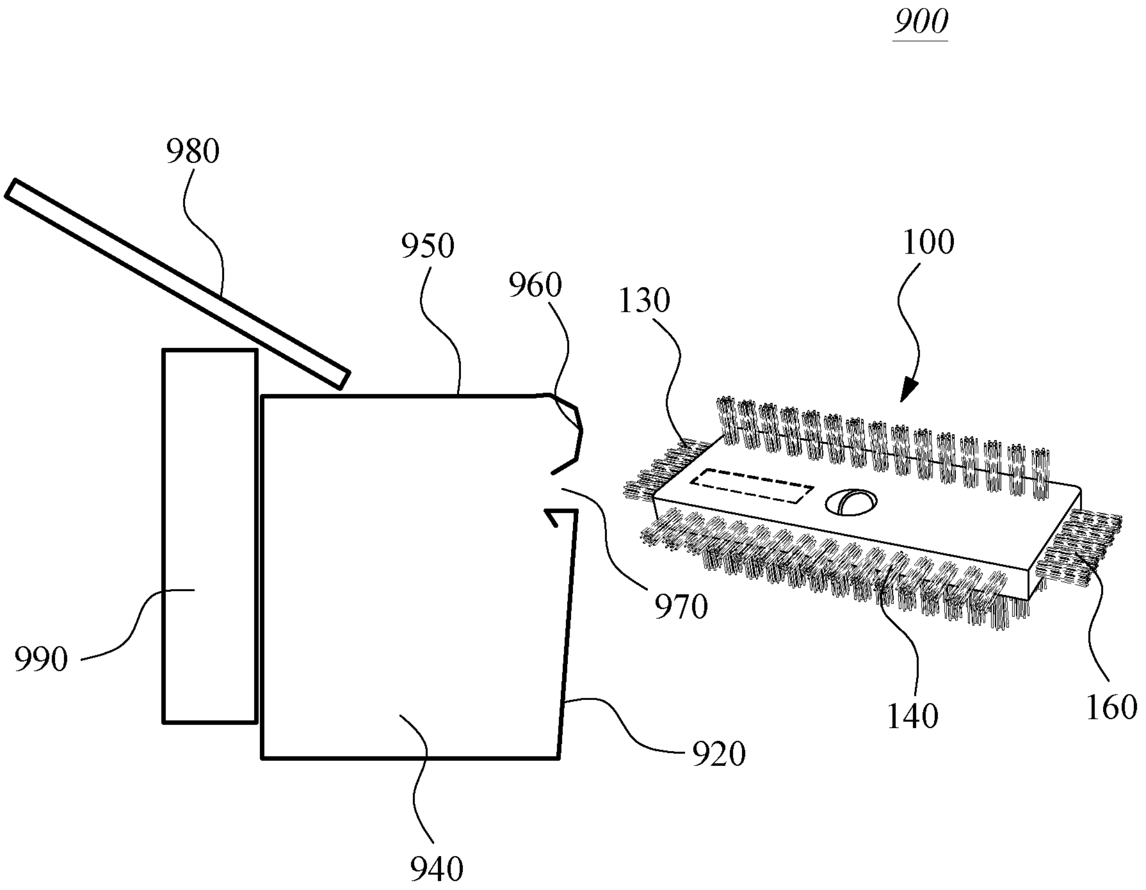
FIG. 9 shows a cut-away view of a gutter fitted with a reverse curve type gutter guard.

FIG. 9 shows a cut-away view 900 of a gutter 940 fitted with a reverse curve type gutter guard 950. Gutter 940 is attached to roof fascia 990 with roof edge 980 leading to the gutter's top surface, where the gutter guard 950 is situated. Rainwater from the roof edge 980 generally travels over the top of the gutter guard 950 and the reverse curve 960 (under surface tension properties) to run into the gap 970 to fall into the gutter 940. However, it is common for drip off to occur at the front of the gutter 920 and not go into the gutter 940, because the gap 970 gets clogged with debris. The exemplary brush's 100 optional left side bristles 130 (as well as any of the other laterally oriented bristles 140, 160) can be used to clean the gap 970.

Figure 10A:
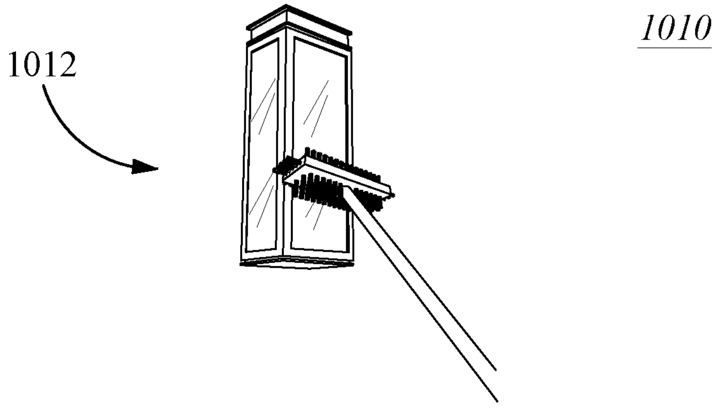
FIG. 10A is an illustration showing a use of the exemplary brush to clean an exterior light cover.

FIG. 10A is an illustration 1010 showing the use of the exemplary brush to clean an exterior light cover 1012.

Figure 10B:
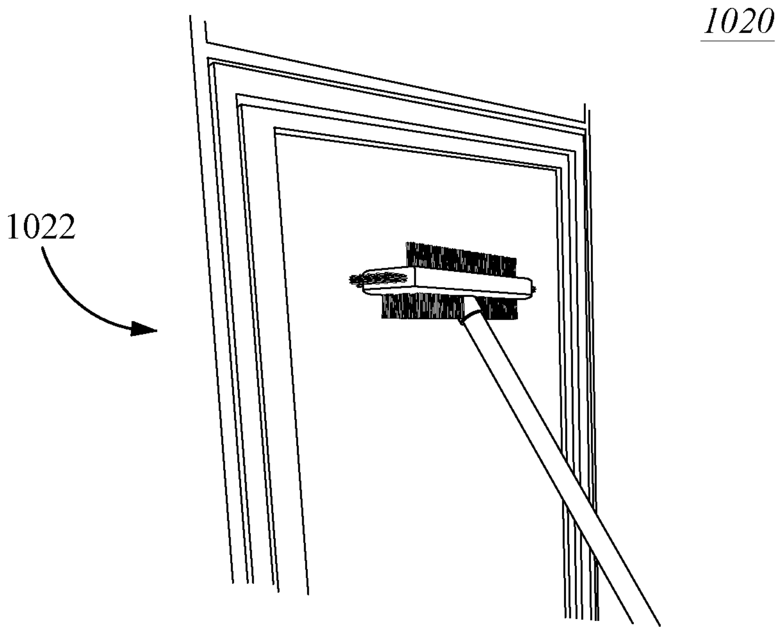
FIG. 10B is an illustration showing a use of the exemplary brush to clean a window face.

FIG. 10B is an illustration 1020 showing the use of the exemplary brush to clean a window face 1022.

Figure 10C:
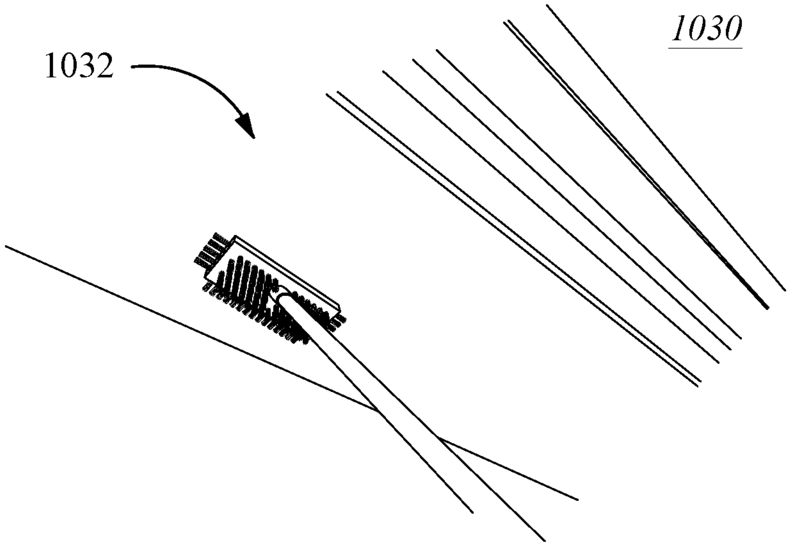
FIG. 10C is an illustration showing a use of the exemplary brush to clean a soffit.

FIG. 10C is an illustration 1030 showing the use of the exemplary brush to clean a soffit 1032.

Figure 10D:
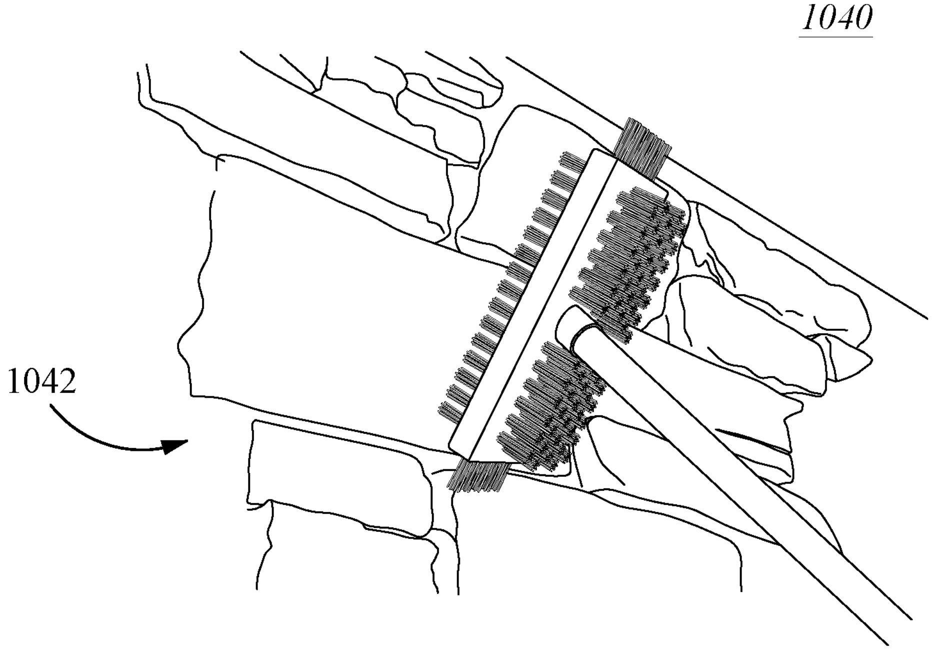
FIG. 10D is an illustration showing a use of the exemplary brush to clean in the crevices between stone masonry.

FIG. 10D is an illustration 1040 showing the use of the exemplary brush to clean in the crevices between stone masonry 1042.

Figure 10E:
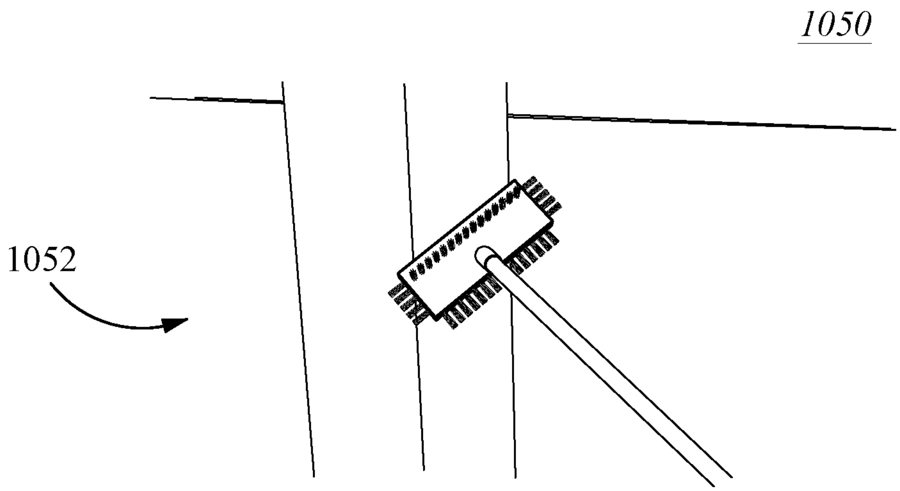
FIG. 10E is an illustration showing a use of the exemplary brush to clean the surfaces of a garage door.

FIG. 10E is an illustration 1050 showing the use of the exemplary brush to clean the surfaces of a garage door 1052.

Figure 10F:
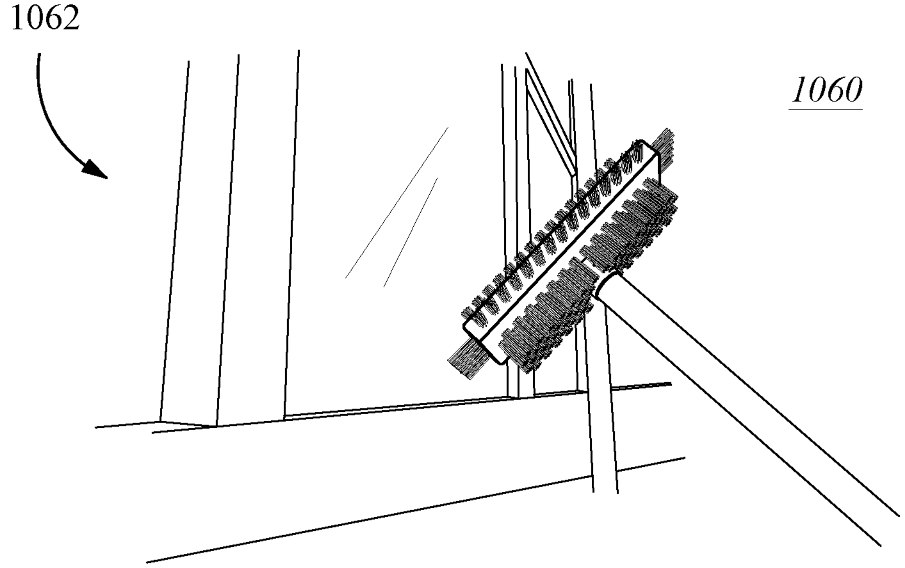
FIG. 10F is an illustration showing use of the exemplary brush to clean the edges of a window.

FIG. 10F is an illustration 1060 showing the use of the exemplary brush to clean the edges of a window 1062.

Figure 10G:
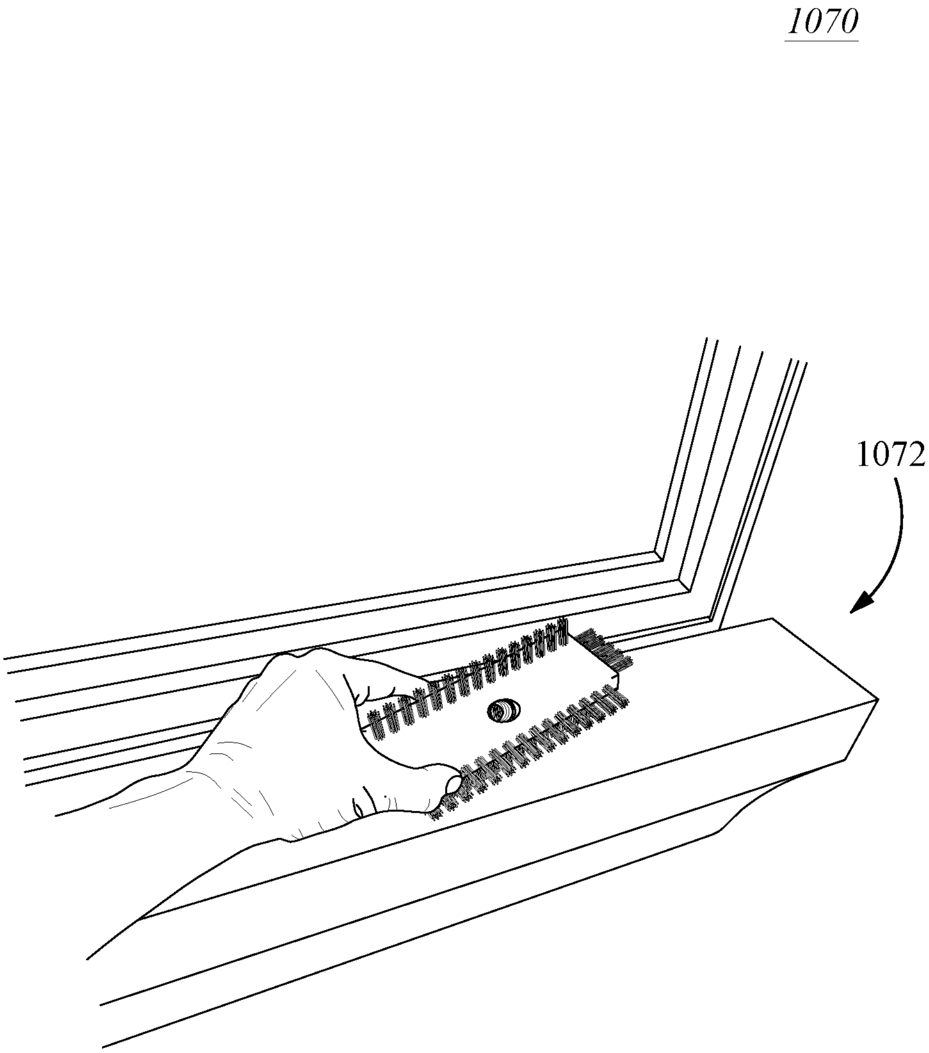
FIG. 10G is an illustration showing a use of the exemplary brush (without the pole) to clean the ledge of a window.

FIG. 10G is an illustration 1070 showing the use of the exemplary brush (without the pole) to clean the ledge 1072 of a window.

In view of the above illustrated embodiments, it is understood the exemplary brush's configuration of bristles provides multiple-uses, is well-suited for cleaning the top, bottom, sides, gaps of gutter guards, and can be used for other exterior surfaces found on homes or buildings. Furthermore, the exemplary brush eliminates the need for a gutter cleaning person to risk injury working on the roof.

Accordingly, the present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A brush adapted to be affixed to a pole, comprising:

a bristled head having a top face and a bottom face and a plurality of lateral faces, wherein the bottom and top faces are larger than the lateral faces, the bristled head having an orifice from the bottom face to the top face with an axis non-perpendicular to the bottom face; and
bristles disposed on the top face and the bottom face, and at least one of the lateral faces,
wherein an opening of the orifice at the bottom face is adapted for receiving a pole.

2. The brush of claim 1, further comprising an extension pole mounted within the orifice from the bottom face.

3. The brush of claim 1, wherein an angle for attaching a pole is approximately 30 degrees.

4. The brush of claim 1, wherein the orifice is threaded.

5. The brush of claim 1, wherein the orifice is multi-width.

6. The brush of claim 1, wherein the top and bottom faces are substantially flat.

7. The brush of claim 1, wherein the bristles on a face are of a uniform length.

8. The brush of claim 7, wherein the bristles on a face is at a length different from the bristles of the other faces.

9. The brush of claim 1, wherein one or more corners of the head are at an angle to form a rectangular head or smooth to form an oval head.

10. The brush of claim 1, wherein the head does not have bristles on a front lateral face.

11. The brush of claim 1, wherein the bristles are disposed at an angle to its respective face.

12. The brush of claim 1, wherein the bristles cover a rear face of the lateral faces.

13. The brush of claim 12, wherein the bristles also substantially cover side faces of the lateral faces.

14. A brush for removing debris from gutter guards, comprising:
a block retaining bristles having a top and bottom face and a plurality of lateral faces, wherein the bottom and top faces are substantially larger than the lateral faces;
bristles extending outwardly from the top face and bottom face, and at least one of the top and lateral faces, the bristles arranged in a uniform pattern on the bottom face; and
an angled mounting fixture disposed in central portion of the bottom face, an axis of the angled mounting fixture being oriented at an acute angle relative to the bottom face, and adapted to secure a handle mounted therein.

15. The brush of claim 14, further comprising a handle secured into the angled mounting fixture.

16. A brush adapted to be affixed to a pole, comprising:
a bristled head having a top face and a bottom face and a plurality of lateral faces, wherein the bottom and top faces are larger than the lateral faces, the bristled head having an orifice from the bottom face to the top face;
bristles disposed on the top face and the bottom face, and at least one of the lateral faces,
wherein an axis of the orifice is non-perpendicular to the bottom face and an opening of the orifice at the bottom face is adapted for receiving a pole; and
a pole mounted within the orifice from the bottom face.

* * * * *